Sept. 27, 1966 T. J. HORTON 3,275,302
DEVICE FOR STORING AND MIXING DENTAL AMALGAMS
Filed March 15, 1965
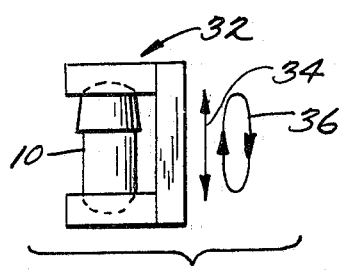
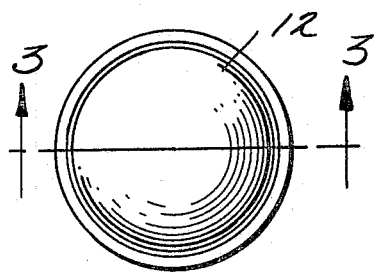
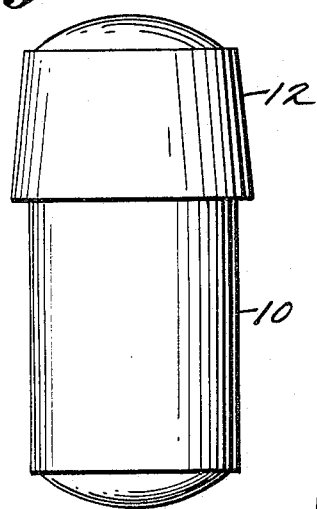
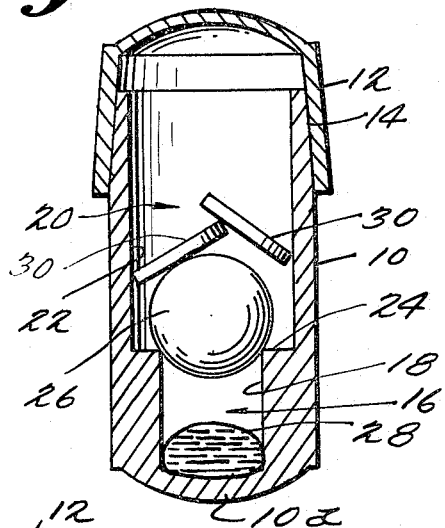
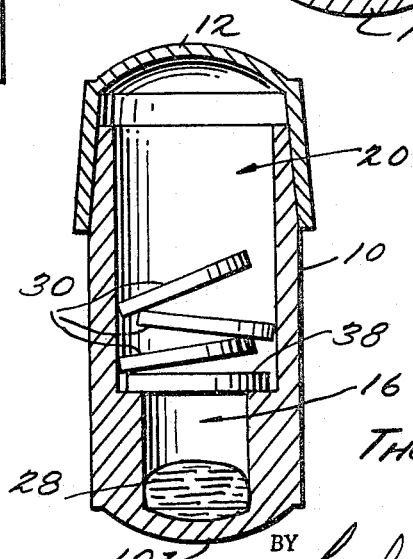
INVENTOR
THOMAS J. HORTON
BY Cushman, Darby & Cushman
ATTORNEYS United States Patent Office 3,275,302
Patented Sept. 27, 1966

3,275,302
DEVICE FOR STORING AND MIXING
DENTAL AMALGAMS
Thomas J. Horton, P.O. Box 168, Farmville, N.C.
Filed Mar. 15, 1965, Ser. No. 439,823
3 Claims. (Cl. 259—72)

This invention pertains to a device for storing and mixing dental amalgams.

In the practice of dentistry, after the cavity is prepared for filling the dentist or his assistant mixes a predetermined amount of a previously prepared alloy with a predetermined amount of mercury. Upon the mercury being mixed with the alloy, a form of crystallization then ensues, thus forming the amalgam crystalline material. As is well understood, this remains in a workable or "plastic" condition for a short period of time, but the crystallization or "setting" process is fairly rapid. It is furthermore important that the cavity be filled promptly upon its having been prepared. Therefore, it is the objective of the dental office to be equipped to rapidly form the amalgam from the alloy and mercury at the very moment it is required. The present invention accomplishes this end by providing a device in the nature of a capsule, in which the alloy and mercury may be permanently stored without affecting one another over an extended period of time, in precisely determined proportions, but the mixing can be carried out immediately simply by taking the capsule and placing it in the available mixing or agitating device.

These objects are accomplished in accordance with the present invention by providing a body member for the capsule having an open end and a closed end. Within the body member there is formed a first chamber adjacent the closed end wherein the mercury may reside, this being positioned downwardly while the capsule is in storage. Storage may be accomplished by having a member such as a board or tray with holes therein to receive the capsule and support same in upright position. The body member has formed within it a second chamber, which extends upwardly from the first chamber and communicates with the open end of the body member. At a position intermediate the ends of the body member there is a position or location of intercommunication between the chambers. The device further includes a separate member, loose within the body member, which has a cross-sectional configuration of greater diameter than the first chamber at the intercommunicating position, but of lesser cross-sectional dimension than the second chamber thereat. Thus, during the period of storage the loose member will rest upon and cover or block off the first chamber from the second. The pellets or powder of alloy may be placed in the second chamber after the loose member is in its blocked position. In this fashion, a mixture of the alloy and mercury is prevented.

The body member is provided with a cap which completes the closure of the device. In use, the complete device is picked out of the storage tray by the operator and placed in a shaking device. This may be any one of several available. By embodying a shaking action the alloy, the mercury and the loose member all agitate, and the alloy mixes with the mercury. The loose member facilitates the breaking-up of alloy powders and the general mixing action. However, the loose member is selected of a material, such as steel, which will not enter into any chemical reaction with the constituents that will form the amalgam.

Two illustrative forms of the invention are shown in the herewith drawings, in which:

FIGURE 1 shows a side elevational view of the complete capsule or device which is illustrative of the invention.

FIGURE 2 shows a top plan view of the device of FIGURE 1.

FIGURE 3 shows a cross-sectional view taken along the line 3—3 of FIGURE 2.

FIGURE 4 is a view similar to that of FIGURE 3 except illustrating a different embodiment of inventive feature within the device, and FIGURE 5 is an illustration of how the capsule of the other figures would be captured in some suitable agitating device for the mixing or amalgamating operation.

Referring to FIGURES 1, 2 and 3, the preferred form of the invention is illustrated. Reference character 10 designates the body member, having a cap 12 shown with a slightly tapering, press-fit as at 14. Within the body member 10 is formed a first chamber 16 defined by a cylindrical bore having a wall 18. The bottom of chamber 16 is closed by end wall 10a of the body member 10. Also formed within the body member 10 is a second chamber 20 formed by a cylindrical bore 22. Bore 22 is of greater diameter than bore 18, thus forming at shoulder 24 an intermediate communicating position between the chambers 16 and 20.

A loose member, for example, a steel ball 26, is provided within the body member 10, this ball having a diameter which is greater than that of bore 18, but less than that of bore 22. Therefore, the ball rests partially in the circular opening of bore 18, and forms a block or partition between the chambers 16 and 20.

The device as thus far described will be utilized by temporary removal of cap 12 and ball 26 whereupon a predetermined quantity of mercury 28 is placed in the first chamber 16. Thereupon the ball 26 is dropped in place and a predetermined amount of alloy, normally in the form of pellets 30, but sometimes as powder, is placed about or above the ball 26. Thereafter, the cap 12 is placed upon the body member 10. The complete device may then be stored as aforesaid, in a tray, the main requirement being that the devices remain substantially upright as shown in the drawings, to prevent the mercury running past the ball 26 and contacting the alloy 30.

A considerable number of the devices may be on hand in a dental office and therefore a complete supply for a day, a week or longer may be on hand. Various capsules may be loaded with differing amounts of mercury and alloy and suitably marked upon the storage tray so that from one cavity to another the dentist may select a capsule known to contain an amount of amalgam suitable for his purpose.

When the dentist is ready to use the analgam, the capsule as shown in FIGURES 1–3 is placed in any suitable mixing apparatus, such as that diagrammatically illustrated in FIGURE 5 by reference character 32. By suitable mechanical means (not shown) the entire unit is given a rapid shaking motion along the axis thereof, as suggested by directional arrow 34 in FIGURE 5, or possibly by a motion including components in more than one direction such as suggested by the elliptical arrow 36 in FIGURE 5. Since the mixing or agitating mechanism forms no part of the present invention, none is described in detail herein. Various suitable mechanisms are known in the art and reference is made thereto. In general, these devices have means for capturing the capsule between the ends thereof and holding same firmly while the agitating motion is accomplished.

It will be observed that during the agitating motion the ball 26, due to its inertia, and being free to move within the chamber 20, will move rapidly upwardly and downwardly. At the same time, the mercury, due to its inertia, will splash in and out of the chamber 16. Additionally, in the case where the alloy 30 is in pellet form, the ball 26 will serve as a hammer to break up the pellets, thus permitting same to mix over increased surface area with the mercury.

As above stated, the embodiment shown in cross-section in FIGURE 3 is preferred, due to the spherical ball 26 providing a good closure to the cylindrical bore 18. However, to show another illustrative from the invention may take, the use of a flat, cylindrical wafer 38 is shown in FIGURE 4. The structure of FIGURE 4 may be in all respects the same as that of FIGURES 1-3, except for wafer 38 being substituted for the ball 26. Therefore, the same reference characters are applied to similar parts.

From the foregoing description, it will be understood that the chambers need not be cylindrical, depending upon the form and contour of the blocking member which is employed at the intermediate communicating position between the chambers. Instead, the chambers may take any configuration desired. It will be further apparent that any suitable materials may be used for the body member, the cap and the blocking member, the only requirement being that these components be selected of materials which will not enter into the amalgamating reaction or process between the alloy and the mercury, nor with the mercury or alloy per se. As mentioned, steel may be employed as the blocking member, and Bakelite may be employed to form the body member and cap.

In view of the many forms the invention may take as to details, it is emphasized that the embodiments just described, with reference to the drawings, are illustrative only and the true scope of the invention is to be determined from the appended claims.

Applicant is aware of the United States patent to Hvistendahl 2,759,712, granted August 21, 1956, which shows a device with a partition therein for separating mercury from alloy, but this requires pulling of a strand to permit mixing and is in general undesirable. Applicant is further acquainted with the patent to Greenberg 2,527,992, granted Octomber 31, 1950, which shows a capsule with partition and arrangement for pushing a plug through the partition, or puncturing the partition to permit two constituents to intermix. However, this again is undesirable and neither of these concepts or any others of which applicant is aware in any way accomplish the purposes of or anticipate the present invention.

What is claimed is:

1. A device for storing and mixing dental amalgams comprising a body member having an open end and a closed end, a first chamber of given cross-sectional dimension formed within and adjacent to the closed end of the body member, a second chamber formed within and communicating with the open end of the body member, the two chambers communicating with each other at a position intermediate said ends of the body member, the second chamber being of greater cross-sectional dimension than the first chamber at said intermiate communicating position, a member loose within said second chamber but of sufficient size to close off said first chamber from the second chamber when the body member is maintaianed open end up, and a cap member fitted over the open end of the body member, the arrangement being such that a predetermined amount of mercury may be stored in said first chamber and a predetermined amount of alloy stored in the second chamber with the loose member separating same, and upon shaking of the device the loose member will become dislodge to permit mixing of the mercury and alloy to form an amalgam, with the loose member aiding in subdividing and mixing said materials to form the amalgam.

2. A device as in claim 1 wherein the first chamber is circular at said intermediate communicating portion and the loose member is a sphere.

3. A device as in claim 1 wherein the loose member is a circular wafer or diameter sufficient to cover said intermediate communicating portion when lying thereon.

References Cited by the Examiner
UNITED STATES PATENTS

| | | | |
|---|---|---|---|
| 2,339,092 | 1/1944 | Meltzer | 259—91 |
| 2,527,992 | 10/1950 | Greenberg | 259—72 |
| 2,759,712 | 8/1956 | Hvistendahl | 259—72 |
| 3,185,462 | 5/1965 | Shore. | |
| 3,198,502 | 8/1965 | Thompson | 259—72 |

WALTER A. SCHEEL, *Primary Examiner.*